(12) United States Patent
Kavaler

(10) Patent No.: US 9,176,224 B2
(45) Date of Patent: Nov. 3, 2015

(54) APPARATUS AND METHOD USING RADAR IN THE GROUND TO DETECT AND/OR COUNT BICYCLES

(71) Applicant: Sensys Networks, Inc., Berkeley, CA (US)

(72) Inventor: Robert Kavaler, Kensington, CA (US)

(73) Assignee: Sensys Networks, Inc., Berkeley, CA (US)

( * ) Notice: Subject to any disclaimer, the term of this patent is extended or adjusted under 35 U.S.C. 154(b) by 364 days.

(21) Appl. No.: 13/844,936

(22) Filed: Mar. 16, 2013

(65) Prior Publication Data
US 2014/0118180 A1     May 1, 2014

Related U.S. Application Data

(62) Division of application No. 13/111,957, filed on May 20, 2011, now abandoned, which is a division of application No. 12/327,047, filed on Dec. 3, 2008.

(60) Provisional application No. 60/992,650, filed on Dec. 5, 2007.

(51) Int. Cl.
| | |
|---|---|
| *G01S 13/04* | (2006.01) |
| *G08G 1/042* | (2006.01) |
| *E01F 11/00* | (2006.01) |
| *G01S 7/00* | (2006.01) |
| *G08G 1/02* | (2006.01) |
| *G01S 13/91* | (2006.01) |

(52) U.S. Cl.
CPC ................ *G01S 13/04* (2013.01); *E01F 11/00* (2013.01); *G01S 7/003* (2013.01); *G08G 1/02* (2013.01); *G08G 1/042* (2013.01); *G01S 13/91* (2013.01); *G01S 2013/916* (2013.01)

(58) Field of Classification Search
CPC ......... G01S 13/04; G01S 13/91; G01S 7/003; E01F 11/00; G08G 1/042; G08G 1/02
See application file for complete search history.

(56) References Cited

U.S. PATENT DOCUMENTS

| | | | | |
|---|---|---|---|---|
| 3,582,620 A | * | 6/1971 | Noetinger | 701/119 |
| 5,491,475 A | * | 2/1996 | Rouse et al. | 340/933 |

(Continued)

FOREIGN PATENT DOCUMENTS

| | | | | | |
|---|---|---|---|---|---|
| GB | 1293881 A | * | 10/1972 | | G01S 9/44 |
| JP | 01035699 A | * | 2/1989 | | G08G 1/09 |

OTHER PUBLICATIONS

Hintermayer, Bernhard. Automated Counting Devices for Cyclists in Vienna. Abstract. Dec. 2004. Accessed May 11, 2015. <https://forschung.boku.ac.at/fis/suchen.hochschulschriften_info?sprache_in=en&menue_id_in=206&id_in=&hochschulschrift_id_in=4622>.*

*Primary Examiner* — Matthew M Barker
(74) *Attorney, Agent, or Firm* — Earle Jennings

(57) ABSTRACT

A package, wireless sensor module, wireless sensor node and wireline sensor node are disclosed including a radar configured to embed beneath vehicles in pavements, walkways, parking lot floors and runways referred to herein as in ground usage. An access point interfacing to at least one of the sensors is disclosed to provide traffic reports, parking reports, landing counts, takeoff counts, aircraft traffic reports and/or accident reports based upon the sensor's messages regarding the radar and possibly magnetic sensor readings. A runway sensor network is disclosed of radar sensors embedded in lanes of at least one runway for estimating the landing count and/or takeoff count effect of aircraft.

20 Claims, 7 Drawing Sheets

(56) References Cited

U.S. PATENT DOCUMENTS

| | | | |
|---|---|---|---|
| 6,662,099 B2* | 12/2003 | Knaian et al. | 701/117 |
| 7,382,238 B2* | 6/2008 | Kavaler | 340/438 |
| 7,821,422 B2* | 10/2010 | Hutchison et al. | 340/907 |
| 8,199,046 B2* | 6/2012 | Nanami | 342/52 |
| 2005/0190077 A1* | 9/2005 | Kavaler | 340/933 |

* cited by examiner

APPARATUS AND METHOD USING RADAR IN THE GROUND TO DETECT AND/OR COUNT BICYCLES

CROSS REFERENCE TO RELATED DOCUMENTS

This patent application is a divisional patent application of U.S. patent application Ser. No. 13/111,957, filed May 20, 2011 and of U.S. patent application Ser. No. 12/327,047, filed Dec. 3, 2008, which claimed priority to U.S. Provisional Patent Application 60/992,650 filed Dec. 5, 2007, all of which are incorporated in their entirety herein.

TECHNICAL FIELD

This invention relates to vehicle detection modules, in particular, to vehicular sensors including radar sensors in communication with a sensor network and to runway sensor networks of radar equipped sensor modules embedded in at least one runway.

BACKGROUND OF THE INVENTION

Previous art for radar detectors typically use a single radar mounted above the vehicle (on the side of the roadway or directly above it) to detect the motion of vehicles. As such, these are motion detectors and not presence detectors. Also, previous radar detectors consume large amounts of energy because they are far from the vehicles they are trying to detect.

SUMMARY OF INVENTION

The apparatus embodiments of the invention include a sensor module, a package and a wireless sensor node. The sensor module may include at least one radar configured to be used in ground for generating a radar reading based upon the presence of at least one vehicle, a radio for sending a state message based upon the radar reading and a power control circuit configured to provide power to the radar and to the radio. The package may include a radar antenna for coupling with the radar and a radio antenna for coupling with the radio. The wireless sensor node may include the radar antenna coupled to the radar to generate the radar reading, the radio antenna coupled to the radio to send the state message and the power control circuit configured to provide the power to the radar and to the radio. Using the radar in the ground may include the radar used in a pavement, a walkway, a parking lot floor and/or a runway.

The power control circuit and/or the sensor module and/or the wireless sensor node may further include a processor.

In the sensor module and/or in the wireless sensor node, the processor may be communicatively coupled to the radar to receive the radar reading and further communicatively coupled to the radio to send the state message. The processor may be further communicatively coupled with a local clock configured to maintain a local clock count. The processor may further receive a synchronization message to create a global clock estimate at least partly maintained based upon the local clock count. The radio may receive the synchronization message. Alternatively, the synchronization message may be received via a wireline interface.

The processor may include at least one instance of a finite state machine and/or of a computer accessibly coupled with a computer readable memory including a program system. The program system may include at least one program step for instructing the computer.

The sensor module and/or the wireless sensor node may include a magnetic sensor for generating a magnetic sensor reading based upon the presence of the vehicle.

The magnetic sensor may employ a magneto-resistive effect to create the magnetic sensor reading. Alternatively, the magnetic sensor may employ an open loop sensor.

The radio may employ at least one of a wireless communications protocol, a time division multiple access protocol, a frequency division multiple access protocol, a code division multiple access protocol, a frequency hopping multiple access protocol, a time hopping multiple access protocol, a near-field wireless connection and/or a wavelet division multiple access protocol.

Various embodiments of the invention may include methods using at least one radar embedded beneath a lane for at least one vehicle, which may include the following: Receiving at least one radar reading from the radar based upon the presence of the vehicle. Using the at least one radar reading to assert a vehicle detect state. And using the undetection of the presence of the vehicle during the vehicle detect state to increment a vehicle count.

In various embodiments of the invention, the vehicle may include at least one of a bicycle, an automobile, a truck, a tractor, a trailer, and/or an airplane. Traffic reports may be provided for bicycles separate from automobiles, etc. traveling through intersections.

Using the at least one radar may further include using at least one magnetic sensor embedded beneath the lane. The methods may further include receiving a magnetic sensor reading from the magnetic sensor based upon the presence of the vehicle. Using the radar reading may further include using at least one of the radar readings and at least one of the magnetic sensor readings to assert the vehicle detect state.

In some embodiments, using the at least one radar embedded beneath the lane further comprises the step of using a first radar and a second radar embedded beneath the lane with the vehicle usually passing between the radars.

Another embodiment of the invention includes an runway sensor network for a runway consisting of at least two lanes and including the following: At least two radar sensors, each configured to detect the presence of an aircraft near the radar sensor, each embedded in the lane, for each of the lanes in the runway. And an access point configured to create a landing count of the aircraft landing and/or a takeoff count of the aircraft taking off of the runway based upon at least one radar reading from at least two of the radar sensors embedded in at least one of the lanes. A aircraft traffic report may be generated based upon the landing count and/or the takeoff count. Each of the radar sensors may be further configured to detect the presence of the aircraft within a distance.

The access point may be further configured to receive a message based upon the radar readings at least in part via a wireless physical transport and/or a wireline physical transport from at least one of the radar sensors. At least one of the radar sensors may be at least partly coupled via a form of Ethernet to the access point. The form of Ethernet may further be a form of Power Over Ethernet. In certain embodiments, each of the radar sensors may be coupled via a form of Power Over Ethernet to the access point.

The lanes in the runway may be arranged at least in part as rectangular strips and/or as concentric circular strips.

DETAILED DESCRIPTION OF DRAWINGS

This invention relates to motor vehicle detection modules, in particular, to self-powered vehicular sensors including radar sensors in communication with a wireless sensor network and to runway sensor networks of radar equipped sensor modules embedded in at least one runway.

Contemporary radar applications tend to pick up multiple return signal images, whereas the focus of these applications is on a single return, which allows for a significant power savings, as will be discussed for a first set of apparatus embodiments of the invention. This application will first focus on disclosure of various embodiments of invention's sensor nodes including radar configured to be embedded and used in the ground. Once that has been discussed, wireless sensor network applications for vehicular and possibly bicycle detection will follow. Then the invention's embodiments for aircraft runways will be discussed. Using the radar in the ground will refer to using the radar in a walkway, a pavement, a parking lot floor and/or a runway, as well as combinations of these such as a walkway and a pavement.

Various embodiments of the invention are configured to place the radar 20 underneath the vehicle 6. Because the distances are small, a very low power radar pulse may be transmitted.

Figure 1:
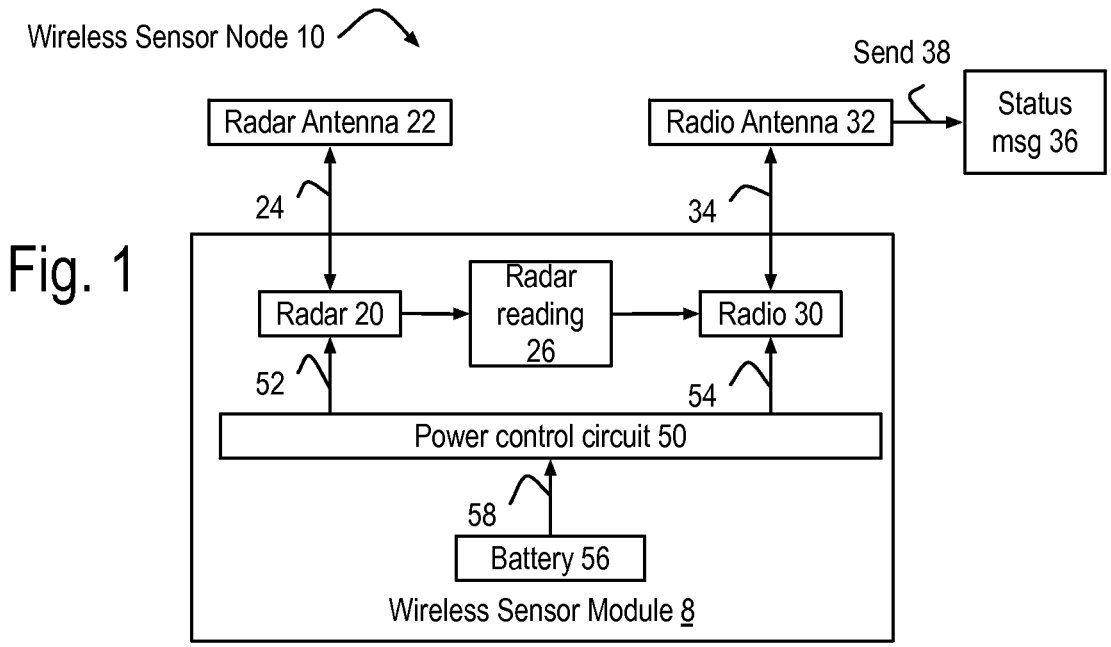
FIGS. 1 and 2 show block diagrams of examples of some apparatus embodiments of the invention that may include a wireless sensor module, a package and a wireless sensor node configured to operate with and/or include a radar and a radio for use in the ground. The radar is configured to create a radar reading based upon the presence of a vehicle and the radio is configured to send a state message based upon at least one of the radar readings. The wireless sensor module and/or the wireless sensor node may preferably include a power control circuit providing power to the radar and the radio.
Figure 2:
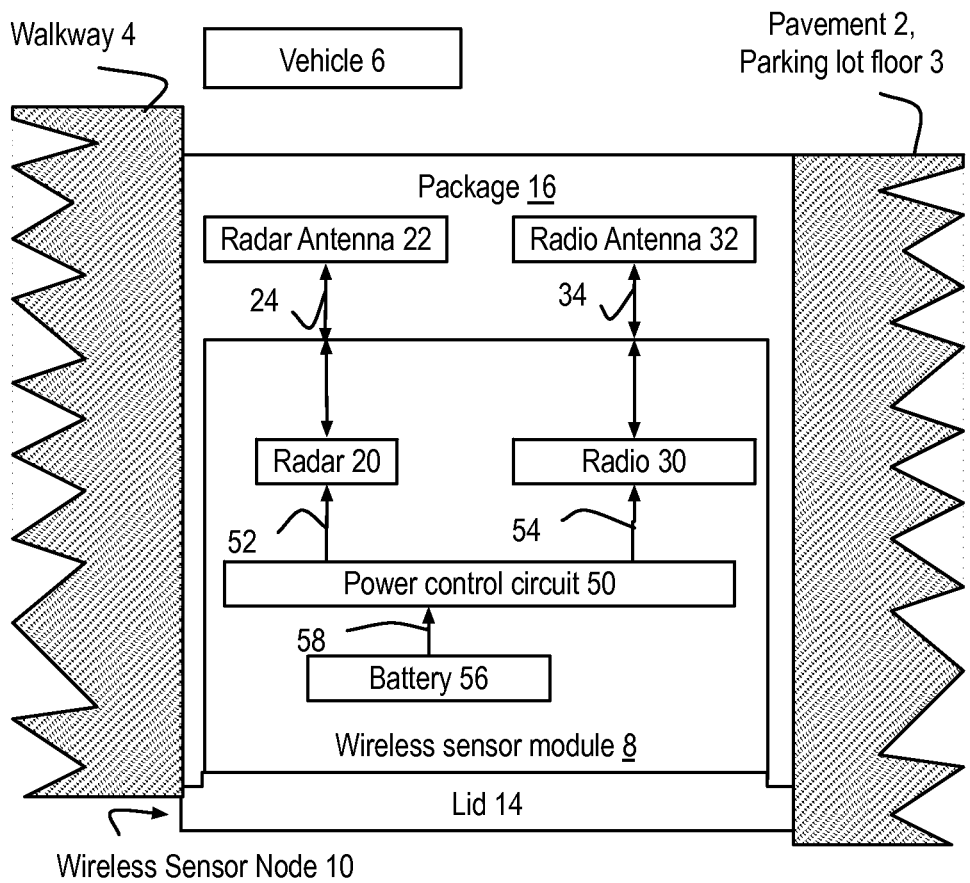

FIGS. 1 and 2 show examples of this first set of apparatus embodiments of the invention that include a wireless sensor module 8, a package 16 and a wireless sensor node 10. The wireless sensor module may include at least one radar 20 for use in the ground generating a radar reading 26 based upon the presence of at least one vehicle 6, a radio 30 for sending a state message 36 based upon at least one of the radar readings and a power control circuit 50 configured to provide power 52 to the radar and power 54 to the radio. The package may include a radar antenna 22 for coupling 24 with the radar and a radio antenna 32 for coupling 34 with the radio. The wireless sensor node 10 may include the radar antenna coupled to the radar to generate the radar reading, the radio antenna coupled to the radio to send the state message and the power control circuit configured to provide the power to the radar and to the radio.

Operating the wireless sensor node 10 may include providing a first power 52 to the radar 20 to create a powered-up radar state, operating the radar in response to the powered-up radar state to create at least one radar reading 26, providing a second power 54 to the radio 30 to create a powered-up radio state, and operating the radio to send 38 a state message 36 based upon the radar reading. Operating the wireless sensor node may further include turning off the power to the radar in response to creating the radar reading(s) and/or turning off the second power to the radio in response to sending the state message. As used herein, the radio may preferably include a transmitter and may also include a receiver, which may have separate power controls in some embodiments of the invention.

The wireless sensor node 10 may include a power control circuit 50 controlling distribution of the first power 52 to the radar 20 and the second power 54 to the radio 30. The power control circuit may receive power from at least one battery 56 and/or an open loop inductor and/or a solar cell, the last two of which are not shown.

Figure 5:
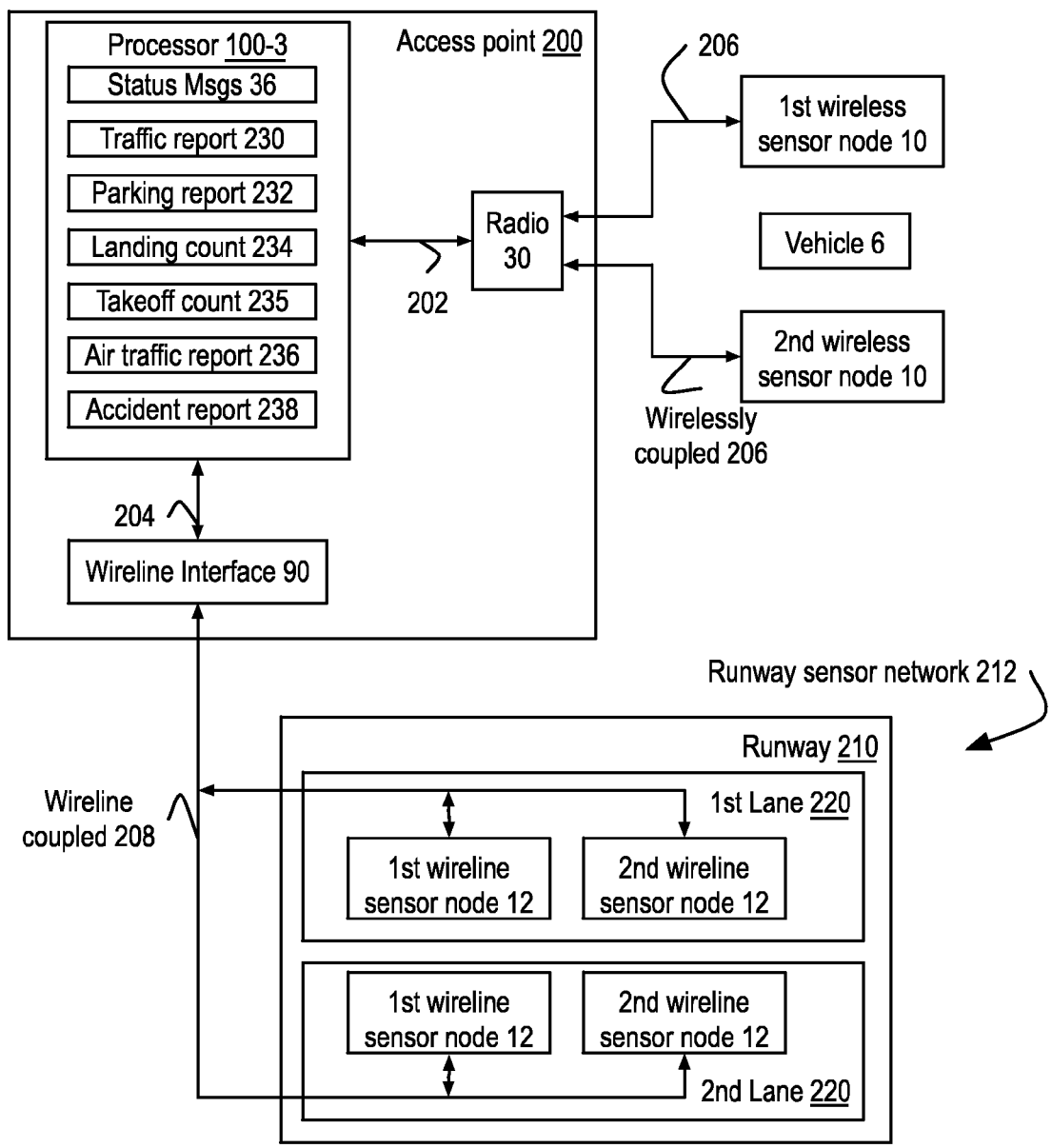
FIG. 5 shows an access point including a processor communicatively coupled to a radio and/or to a wireline interface. The radio may be configured to wirelessly communicate with at least two wireless sensor nodes, possibly arranged so that the vehicle passes between them. The wireline interface and/or the radio may communicate with a runway sensor network for at least one runway. The runway preferably includes at least two lanes, each including at least one sensor node, and preferably more than one sensor node.
Figure 6:
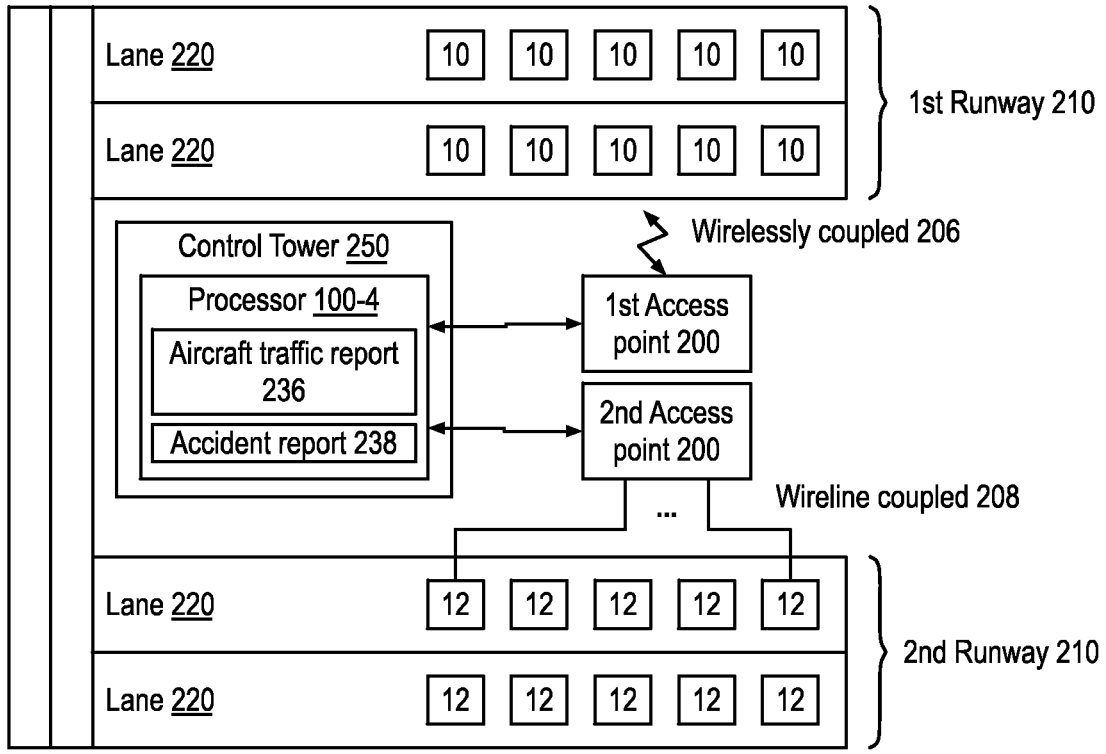
FIG. 6 shows an example of a system reporting on multiple runways in accord with the invention.

FIG. 2 shows the package 16 for the wireless sensor node 10 of FIG. 1 that may include the radar antenna 22 and the radio antenna 32 both preferably placed on or near one surface of the package. In certain cases, the package is intended for installation in a pavement 2, a walkway 4, a parking lot floor 1 and/or a runway 210 as shown in FIGS. 5 and 6. The top surface of the package may preferably be the surface of the pavement once it has been installed. The wireless sensor module 8 may be sealed into the package with a lid 14 to create the wireless sensor node. A sensor node including the radar and configured for use in pavement, walkways, parking lot floors and/or runways may be referred to as an In Ground Micro Radar (IGMR).

The power control circuit 50 and/or the sensor module 8 and/or the wireless sensor node 10 may further include a processor 100-1, 100-2, 100-3, or 100-4.

Each of the radar 20 may preferably detect a single spot, where the size of that spot is selectable by setting the maximum return time of the radar. For detecting vehicles 6 in large parking lot, for example, one radar would be used for each parking spot. For detecting vehicles at the stopbar, typically one radar would be used per lane, although one radar might be used for, for example, all through lanes. Even bicycles 8 and pedestrians may be detected by this radar, making it a very flexible tool for both traffic management and parking lot management.

The radar 20 may preferably operate by sending pulses via the radar antenna 22, preferably in a licensed band such as 5.8 Giga Herz (GHz) or 6.3 GHz, and measuring the travel time of the return pulses. Minimum and maximum constraints are placed on the time associated with the return pulses. In further detail, the size of the detection zone may be selectable by putting constraints on the timing of the return signal. Very low power transmission power is used because the overall ranges of RF signal travel are short, for example, with less than 15 feet round trip.

Because only a small amount of energy is used for the radar 20, these wireless sensor nodes 10 and/or wireline sensor nodes 12 may be battery operated for a long period of time, for example 10 years. The radar may then be connected to a wireless sensor network by a low power radio 30 to communicate the results of the detection as the state message 36 to a central site.

The package 16 may be placed into a cored hole in the pavement 2 or in a walkway 4, and may be mounted flush with the surface. Alternatively the package may be glued to the surface of the pavement. In that case, the box must be rugged enough to protect the electronics and the battery 56.

For parking lot applications, one wireless sensor node 10 may be placed near the middle of each parking spot. When the radar 20 detects a vehicle 6, a signal is sent by the radio 30 to a centralized concentrator, called an access point 200, which will be discussed in greater detail with regards FIGS. 5 and 6. The status of each parking spot, whether the vehicle 6 is parked in the spot of not, is known to the access point. The access point then sends the state of the parking spots to other applications that may provide:

Total number of parking spots available, overall and by region (e.g., floor).

List of which spots are occupied and which are empty at any given time.

Time duration each spot has been occupied.

Time when the spot became occupied.

Time when the spot became free.

Figure 3:
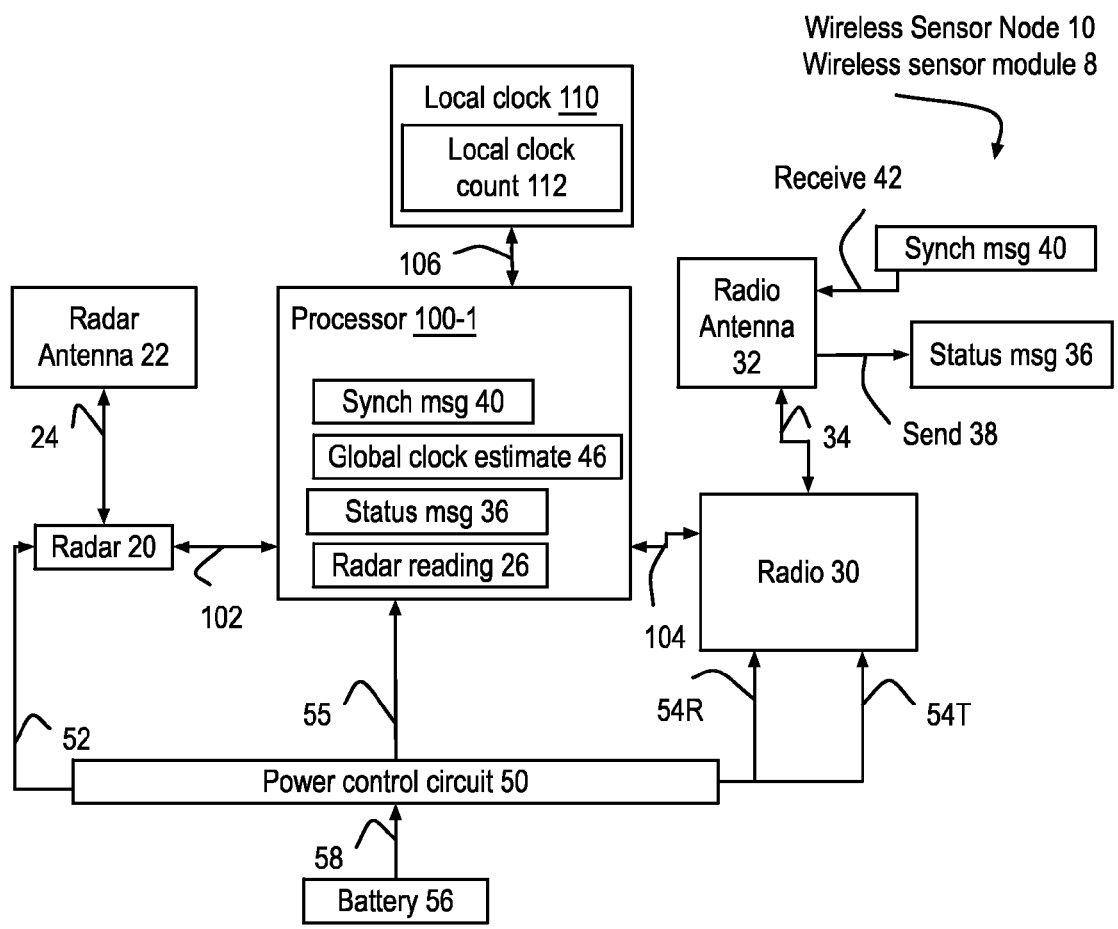
FIG. 3 shows block diagrams of the wireless sensor module and/or the wireless sensor node include a processor communicatively coupled to the radar and the radio, possibly further communicatively coupled to a local clock to create a local clock count that may be used to maintain a global clock estimate. The radio may further receive a synchronization message to further update the global clock estimate. The power control circuit may further provide power to the processor.

FIG. 3 shows a refinement of the wireless sensor node 10 and/or the wireless sensor module 8 of previous Figures, either or both of which may include at least one processor 100-1 that may be first communicatively coupled 102 to the radar 20 to receive the radar reading 26. The processor may further be communicatively coupled 104 to the radio 30 to send the state message 36 based upon the radar reading. The processor may further maintain an estimate of a global clock, known herein as a global clock estimate 46 that may be occasionally updated by receipt of a timing synchronization message 40 received 42 via the radio antenna 32 from the radio. The processor may further be communicatively coupled 106 with a local clock 110 that provides a local clock count 112 either from its state or through triggering a clock timing event such as a clock triggered interrupt of at least part of the processor.

In certain embodiments of the invention, the wireless sensor module 8 may include the radar antenna 22 and/or the radio antenna 32.

The step of operating the radio 30 may be based upon the global clock estimate 46. This step and others may be in compliance with a Time Division Multiple Access (TDMA) communications protocol.

In certain embodiments radio 32 may include a near-field wireless connection. An example of a near-field wireless connection would be a linear wire embedded into or underground and a sensor with an inductive loop to pick up power from the linear wire and a magnetic or RF transmitter that transmits onto the linear wire.

The power control circuit 50 may use the global clock estimate 46 to manage the distribution of power. The power control circuit may manage the power distributed 54 to the radio 30 by separately providing power 54R to its receiver and power 54T to its transmitter.

The range of the radar 20 may preferably be set to detect at no closer than 6" round trip and no more than 8' round trip.

The radar 20 may be sampled at a rate of once per second using the time immediately before the Time Division Multiple Access (TDMA) transmission of the state message 36. The radar may first be powered up, the radar reading 26 taken, the radar power 52 may then be reduced or stopped, possibly before the radio 30 is powered up and turned on. A TDMA radio 30 may take 1.5 ms to power up. If the state of the radar reading has changed (for example, from occupied to not occupied or vice versa) then processor 100-1 may respond with the TDMA transmission taking place, after which the radio may be turned off. Note that for transmission only power to the transmitter 54T may be applied, whereas for radio reception only power to the receiver 54R may be applied.

Figure 4:
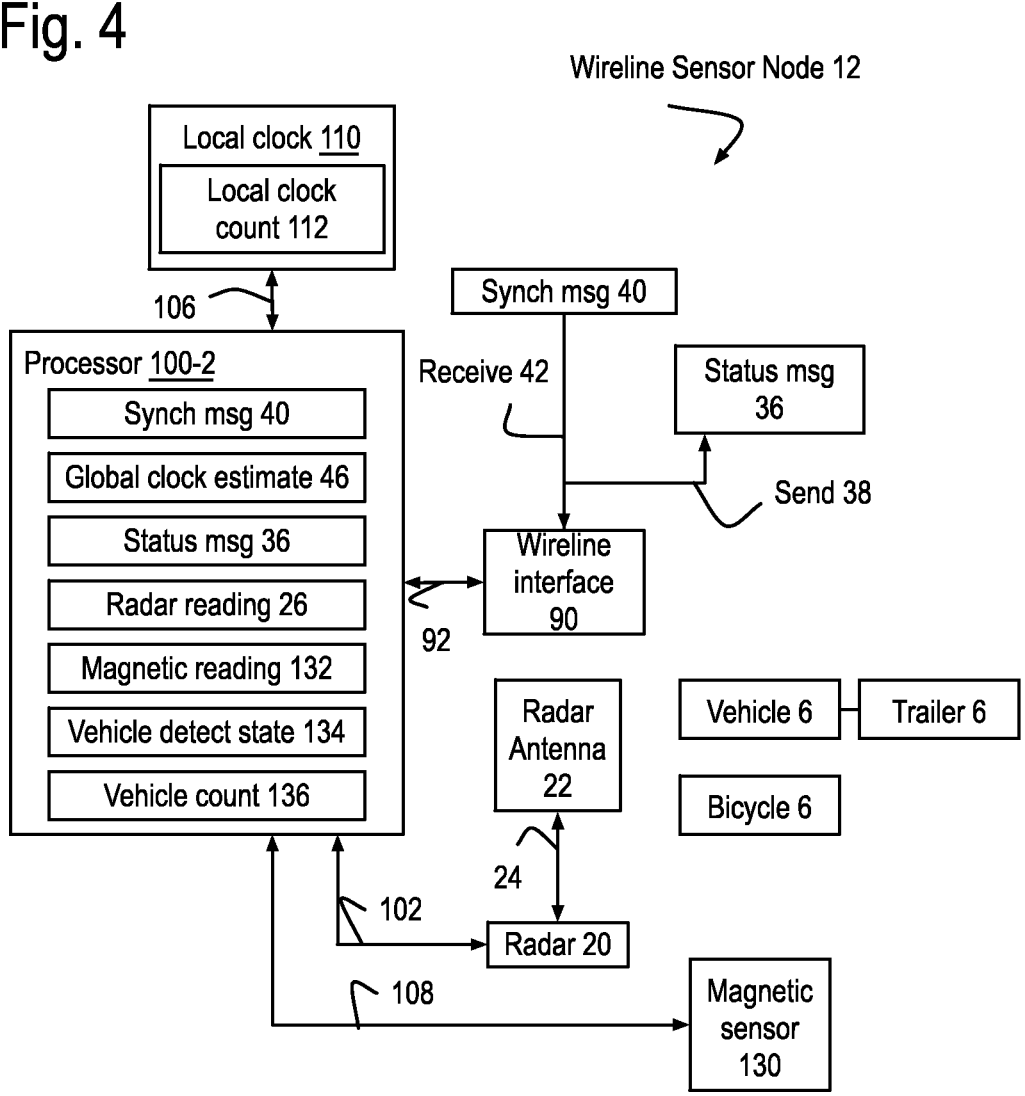
FIG. 4 shows a block diagram of another apparatus embodiment of the invention referred to herein as a wireline sensor node that may preferably include a processor communicatively coupled to the radar and to a wireline interface. A magnetic sensor may also be included in the wireline sensor node as shown in this Figure, and/or in the wireless sensor module and/or in the wireless sensor node, which have not been shown.

FIG. 4 shows a block diagram of another apparatus embodiment of the invention referred to herein as a wireline sensor node 12 that may preferably include a second processor 100-2 communicatively coupled 106 to the radar 20 and communicatively coupled 92 to a wireline interface 90. A magnetic sensor 130 may also be included in the wireline sensor node as shown in this Figure, and/or in the wireless sensor module 8 and/or in the wireless sensor node 10, which have not been shown.

The radar 20 is configured to create a radar reading 26 based upon the presence of a vehicle 6 and the wireline interface 90 is configured to send a state message 36 based upon at least one of the radar readings. The wireline sensor node 12 may include a power control circuit 50 providing power to at least the radar and the radio, which has not been shown, but is similar to the presentation of FIGS. 1 to 3 above. The wireline sensor node may further include the local clock 110 communicatively coupled 106 to the second processor 100-2 or the processor 100-1 as in FIG. 3, and the wireline interface may receive a synchronization message 40. The local clock count 112 and/or the synchronization message 40 may be preferably used to update and maintain a global clock estimate 46. This Figure shows an example of the processor 100-2 further communicatively coupled 108 to a magnetic sensor 130 to create a magnetic sensor reading 132 based upon the presence of the vehicle.

The wireless sensor node 10 and/or the wireline sensor node 12 may have a very low duty cycle because the time to take one measurement is very small, often under one millisecond, compared to the speed of vehicles 6 in parking lot or stop-bar applications that may require a one second sample time. One may further reduce the duty cycle of the radar 20 by using a lower power sensor such as a magnetic sensor 130 for primary detection and then use the radar to verify the detection result. Alternatively a very low power motion detector may be used as a primary detector and then the radar may be used after the motion has settled to determine the current presence state. Done this way, the radar is only used intermittently, consuming very little power.

The vehicle 6 may be some form of automobile or truck or truck trailer. The vehicle 6 may pull a trailer 6. Alternatively, a bicycle 6 may also be detected by the magnetic sensor 130 and/or the radar 20. Various embodiments of the invention preferably count the presence of combinations of these vehicles and may preferably distinguish between vehicles pulling trailers and bicycles and automobiles.

In greater detail, one purpose of the IGMR is to accurately detect the presence or absence of a vehicle 6 through the use of a low power radar 20 mounted in the ground pointing up, detecting any RF reflective material above the ground.

The vehicle 6 may be some form of bicycle or other human powered device, and a network of the IGMR 10 and/or 12 may be able to detect and monitor the presence of them, possibly providing warnings of potential accidents when the vehicle is stopped at inaccessible and/or inhospitable neighborhood.

The vehicle 6 may be some form of an airplane and a network of the IGMR 10 and/or 12 may be implemented in a preferably triangular grid to detect take-offs and landings of airplanes.

Several applications of these IGMR 10 and/or 12 are claimed herein: A network of IGMR may be used to sense whether a truck 6 has an attached truck trailer as shown in FIG. 4. This information may be sent to a shipping yard management center to aid in efficiently dispatching truck trailers where they are needed. The IGMR based wireless sensor 10 network may be able to detect the presence and/or velocity of these vehicles on a roadway or in parking stalls in a parking facility.

For a large number of these wireless sensor nodes 10 and/or the wireline sensor nodes 12, interference among the radars 20 may be controlled by phasing their use. That is, these nodes are operated one at a time. One method to synchronize such sequencing is to use a TDMA based sensor network using the nodes 10 and/or 12 shown in FIGS. 3 and 4 and synchronize the TDMA timeslot used to the radar measurement time for example, sample the radar immediately before sending TDMA time-slot.

The radar 20 may further operate in terms of one or more of the following:
  ON time of at least 10 milliseconds to create a radar reading with a preferred power consumption of at most 4 milliamps.
  OFF time of about 1-second (that is the car/no car sample rate).
  The radar 20 may require Power 3V (flat lithium battery) at several microamps average draw for preferably 10 year battery life.
  The radar 20 may reside on approx 2 inch by 2 inch printed circuit board, possibly having a 0.2 inch thickness for planar, on-board radar antenna 22.
  The radar 20 may preferably operate in a frequency band of about 5.8 GigaHerz in an Industrial, Scientific and Medical (ISM) band using a spread spectrum signal protocol.
  The radar 20 may cost less than $2 (US) when manufactured in quantities of 10,000 units before assembly and test.
  The radar 20 may be powered up before the radio 30, and in some embodiments may be powered down before the radio is powered up.
  And in embodiments of either the wireless sensor node 10 or the wireline sensor node 12, when the magnetic sensor 130 detects the presence of a vehicle, it may be preferred that the radar is not turned on.

In some situations, the magnetic sensor 130 may employ a magneto-resistive sensor that may be sampled in less than forty microseconds. The radar 20 may take ten milliseconds to create the radar reading 26. Sampling the magnetic sensor 128 times per second and sampling the radar once every two seconds may consume about the same power.

One preferred method of detecting vehicle for traffic applications may be seen in the following example:
  The magnetic sensor 130 may be very responsive with a sampling rate of about 128 Hz. The radar 20 may not very responsive with a sampling rate of once every 2 seconds. For traffic applications the time to detect for bicycles 6 may not be critical, but the time to release the vehicle detect state 134 may be critical. Any holdover of the release time may add to the inefficiency of the intersection (assuming the radar will detect cars as well as bicycles). To eliminate this inefficiency, the detection associated with the radar may preferably be cleared immediately when the magnetic sensor reading 132 indicates a vehicle detection has been made.
  If a single bicycle 6 triggers the radar 20 and not the magnetic sensor 130, up to two seconds of holdover may occur (which is not significant since bicycles typically take at least two seconds longer than cars to cross an intersection).
  However, if a car 6 then passes over the magnetic sensor 130 the radar 20 indication will terminate immediately, allowing a traffic controller to change state as it would have if no radar detector was present. The magnetic sensor may be in a separate vehicular sensor node or including in the sensor nodes 10 and 12 of this patent application. This method can be implemented in either sensor or at the access point 200 or at a traffic controller.

FIG. 5 shows an access point 200 including a third processor 100-3 communicatively coupled 202 to a radio 30 and/or communicatively coupled 204 to a wireline interface 90. The radio may be configured to wirelessly communicate with at least two wireless sensor nodes 10, possibly arranged so that the vehicle 6 passes between them. The wireline interface and/or the radio may communicate with a runway sensor network 212 for at least one runway 210. The runway preferably includes at least two lanes 220, each including at least one sensor node 12, and preferably more than one sensor node.

The wireless coupling 206 may preferably be a form of wireless communication coupling, possibly supporting a form of the IEEE 802.15.4 communications protocol, possibly supporting at least one of the following a Time Division Multiple Access (TDMA) protocol, a code sequence spectrum protocol, a frequency hopping protocol, a time hopping protocol, a frequency division multiple access protocol.

The wireline coupling 208 may preferably support a form of Ethernet, possibly further support a form of Power Over Ethernet.

FIG. 6 shows an example of a system reporting on multiple runways 210 in accord with the invention. A control tower 250 may preferably include a fourth processor 100-4 communicating with one or more access points 200, each communicating in turn to IGMR 10 and/or 12 embedded in lanes 220 of the runways 210.

The control tower 250 may use a single access point 200 to generate and/or deliver an air traffic report 236 for one or more of the runways 210. In certain embodiments of the invention, the air traffic report may be used to generate at least part of an accident report 238. In some embodiments of the invention, a traffic controller may also be used similarly to the control tower, though possibly controlling traffic on various lanes based upon traffic reports 230 from the access points as shown in FIG. 5. Alternatively, the traffic controller may receive the parking reports 232 that are used to direct vehicles 6 to different parking structure areas.

Figure 7:
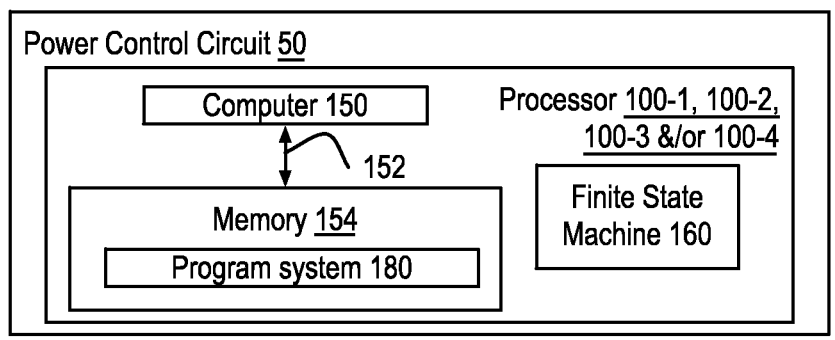
FIG. 7 show the power control circuit including an instance of a processor. It also shows that a processor may include at least one instance of a finite state machine and/or at least one instance of a computer accessibly coupled to a computer readable memory containing a program system for instructing the computer in the use and/or operation of the various embodiments of the invention.

FIG. 7 show the power control circuit 50 including an instance of a processor 100-4. It also shows that any processor 100-1, 100-2, 100-3 or 100-4 may include at least one instance of a finite state machine 160 and/or at least one instance of a computer 150 accessibly coupled 152 to a computer readable memory 154 containing a program system 180 for instructing the computer in the use and/or operation of the various embodiments of the invention. Note that in various embodiments of the apparatus of the wireless sensor module 8, the wireless sensor node 10, the wireline sensor node 12, the power control circuit 50, the access point 200 and/or the control tower 250, the processor may include different instances of various finite state machines and/or computers. The memory 154 may include a volatile memory component and a non-volatile memory component, where the volatile memory component may lose its state when the memory is powered down. The memory 154 may also be a removable memory.

Some of the Figures show flowcharts of at least one method of the invention, which may include arrows with reference numbers. These arrows signify a flow of control, and sometimes data, supporting various implementations of the method. These include at least one the following: a program operation, or program thread, executing upon a computer 150 and/or a state transition in a finite state machine 160.

The operation of starting a flowchart refers to at least one of the following. Entering a subroutine or a macro instruction sequence in a computer 150. Directing a state transition in a finite state machine 160, possibly while pushing a return state. The operation of starting a flowchart is denoted by an oval with the word "Start" in it.

The operation of termination in a flowchart refers to at least one or more of the following. The completion of those operations, which may result in a subroutine return and/or popping of a previously stored state in a finite state machine. The operation of terminating a flowchart is denoted by an oval with the word "Exit" in it.

A computer 150 as used herein includes at least one instruction processing element and at least one data processing element. Each data processing element is controlled by at least one instruction processing element.

FIGS. 8 to 15 show flowcharts of examples and details of the program system 180 for various embodiments of the invention.

Figure 8:
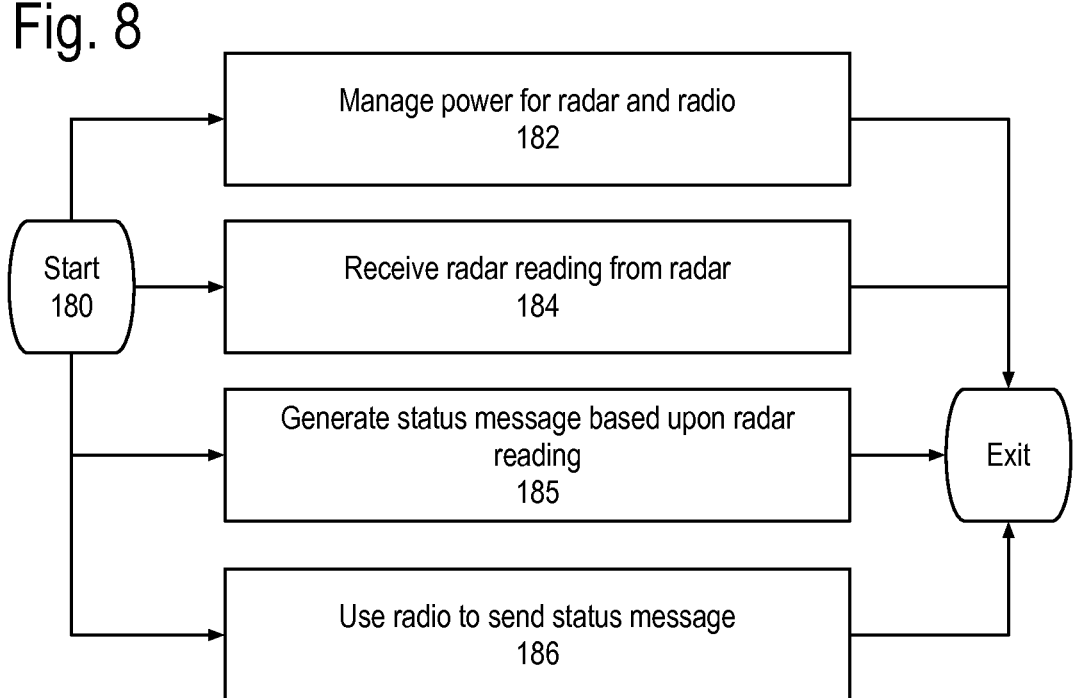
FIGS. 8 to 16 show examples and details of the program system for various embodiments of the invention.

FIG. 8 shows a flowchart of the program system 180 that may include at least one of the following program steps: Program step 182 supports managing the power 52 for the radar 20 and the power 54 for the radio 30. Program step 184 supports receiving the radar reading 26 from the radar. Program step 185 supports generating the status message 36 based upon at least one of the radar readings. Program step 186 supports using the radio to send 38 the status message.

Figure 9:
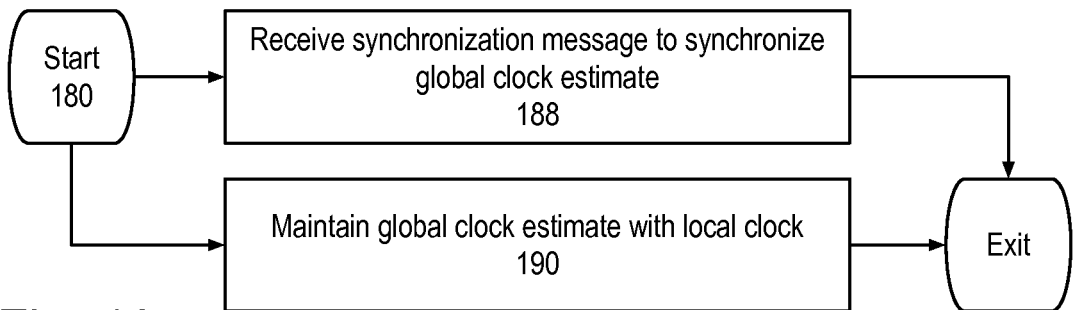

FIG. 9 shows a flowchart of a refinement of the program system 180 that may include at least one of the program steps: Program step 188 supports receiving 42 the synchronization message 40 to synchronize the global clock estimate 46. Program step 190 supports maintaining the global clock estimate with the local clock 110, possibly using the local clock count 112.

Figure 10:
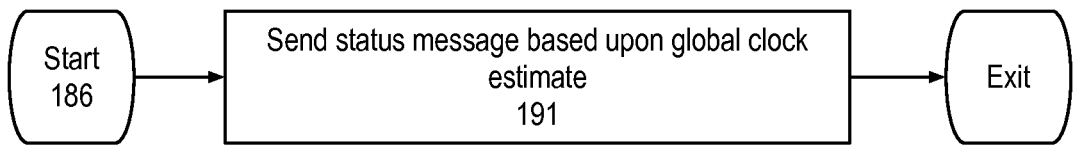

FIG. 10 shows a flowchart of a refinement of the program step 186 of FIG. 8 including program step 191 that supports sending 38 the status message 36 based upon the global clock estimate 46. This refinement may be preferred in a TDMA communication and power control environment upon the synchronization message 40 and the global clock estimate.

Figure 11:
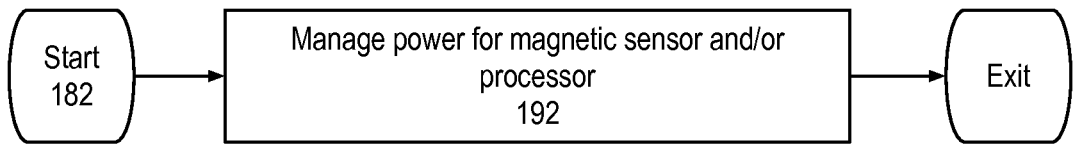

FIG. 11 shows a refinement of program step 182 as program step 192 that further supports managing power for the magnetic sensor 130 and/or power 55 for the processor 100-1.

Figure 12:
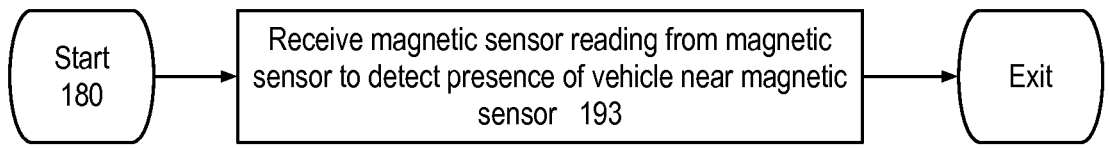

FIG. 12 shows a refinement of the program system 180 as program step 193 that supports receiving the magnetic sensor reading 132 from the magnetic sensor 130 to detect the presence of a vehicle 6 near the magnetic sensor.

Figure 13:
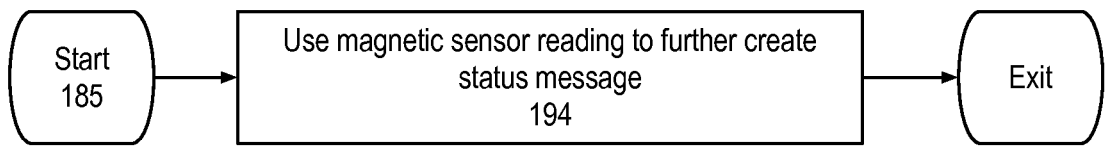

FIG. 13 shows a refinement of the program step 185 generating the status message as including program step 194 that supports using at least one of the magnetic sensor readings 132 to further create the status message 36.

Figure 14:
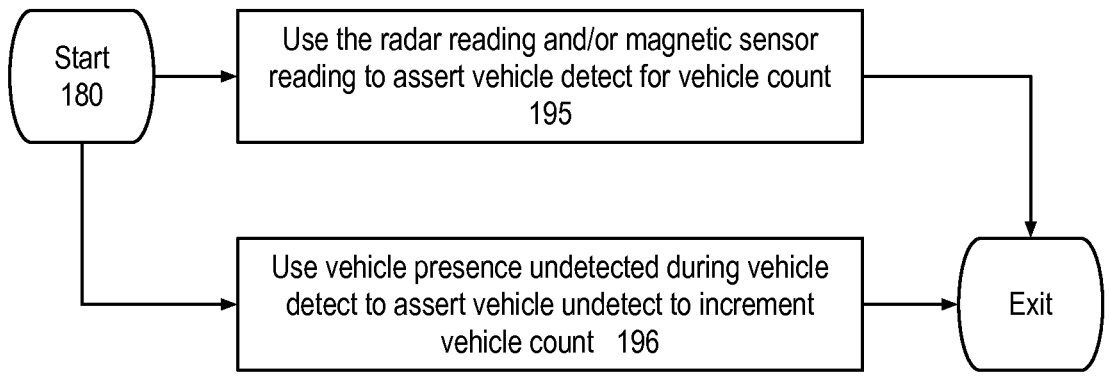

FIG. 14 shows a refinement of the program system 180 including the following program steps: Program step 195 supports using at least one of the radar readings 26 and/or at least one of the magnetic sensor readings to assert a vehicle detect state 134 for a vehicle count 136 as shown in FIG. 4. And program step 196 supports using the vehicle 6 presence being undetected to assert the vehicle undetected and to increment the vehicle count. In some embodiments of the invention, the assertion of the vehicle undetected may be the logical opposite of the vehicle detect state.

Figure 15:
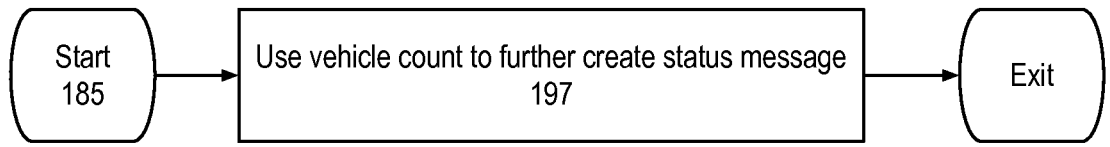

FIG. 15 shows a refinement to program step 185 of FIGS. 8 and 13 including program step 197 that supports using the vehicle count 136 to further create the status message 36.

Figure 16:
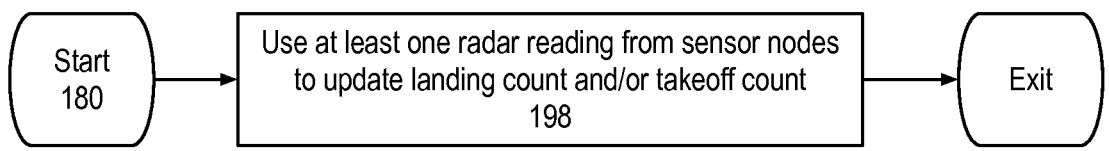

FIG. 16 shows a refinement of the program system 180 to include program step 198 that supports using at least one radar reading from at least two sensor nodes 10 and/or 12 to create and/or update the landing count 234 and/or the takeoff count 235 as shown in FIG. 5. The processor 100-2 may further prepare an air traffic report 236 based upon the landing count and/or the takeoff count.

The preceding discussion serves to provide examples of the embodiments and is not meant to constrain the scope of the following claims.

The invention claimed is:

1. An apparatus, comprising:
a sensor module, configured to be embedded in the ground, and
said sensor module configured to generate a radar reading used to detect the presence of a bicycle near said radar sensor; and
said sensor module, comprising:
a radar configured to generate said radar reading to detect said presence of said bicycle near said radar sensor;
a radio configured to send a message based upon said radar reading via a wireless physical transport and further configured to receive a timing synchronization message to create a global clock estimate;
a processor configured to maintain said global clock estimate using a local clock and to use said received timing synchronization message to occasionally update said global clock estimate; and
a power control circuit coupled to said radar and said radio, said power control circuit configured to couple to a battery, and
said power control circuit configured to control distribution of power from said battery using said global clock estimate to alternatively turn off and on said radar and said radio.

2. The apparatus of claim 1, wherein said sensor module further includes a magnetic sensor configured to generate a magnetic sensor reading in response to the presence of said bicycle.

3. The apparatus of claim 1, wherein said radio employs at least one of
a wireless communications protocol,
a time division multiple access protocol,
a frequency division multiple access protocol,
a code division multiple access protocol,
a frequency hopping multiple access protocol,
a time hopping multiple access protocol,
a near-field wireless connection, and
a wavelet division multiple access protocol.

4. The apparatus of claim 1, further comprising at least one of
a package including
a radar antenna for coupling with said radar and
a radio antenna for coupling with said radio; and
a wireless sensor node including
said sensor module;
said radar antenna coupled to said radar to generate said radar reading;
said radio antenna coupled to said radio to send said message and to receive said timing synchronization message.

5. The apparatus of claim 4, wherein said wireless sensor node includes said battery coupled to said power control circuit.

6. The apparatus of claim 4, wherein said wireless sensor node is embedded in said ground.

7. The apparatus of claim 4, wherein said wireless sensor node is further embedded in at least one of a pavement, a walkway, a lane, and a parking lot floor.

8. The apparatus of claim 1, wherein said radar is configured to operate with an on-time to create said radar reading with a power consumption of at most 4 milliamps at a voltage of about three volts.

9. The apparatus of claim 8, wherein said on-time is about one millisecond with an off-time of about one second.

10. The apparatus of claim 1, wherein said sensor module is configured to detect said bicycle within six feet of said sensor module.

11. The apparatus of claim 1, wherein said processor includes at least one instance of at least one of a finite state machine and of a computer configured to accessibly couple to a computer readable memory including a program system configured to instruct said computer.

12. The apparatus of claim 11, wherein said program system includes at least one of the program steps of
managing said power for said radar and said radio;
receiving said radar reading from said radar;
generating said message based upon said radar reading;
using said radio to send said message;
receiving said timing synchronization message to synchronize said global clock estimate; and
maintaining said global clock estimate with said local clock.

13. A system, comprising:
a sensor module, configured to be embedded in the ground, and
said sensor module configured to generate a radar reading used to detect the presence of a bicycle near said radar sensor; and
said sensor module, comprising:
a radar configured to generate said radar reading to detect said presence of said bicycle near said radar sensor;
a radio configured to send a message based upon said radar reading via a wireless physical transport and further configured to receive a timing synchronization message to create a global clock estimate;
a processor configured to maintain said global clock estimate using a local clock and to use said received timing synchronization message to occasionally update said global clock estimate; and
a power control circuit coupled to said radar and said radio, said power control circuit configured to couple to a battery, and said power control circuit configured to control distribution of power from said battery using said global clock estimate to alternatively turn off and on said radar and said radio; and
said system further comprising
an access point configured to wirelessly communicate with said radio to perform at least one of receive said message based upon said radar reading and send said timing synchronization message to support said processor maintaining said global clock estimate.

14. The system of claim 13, further comprising a second processor configured to respond to said message based upon said radar reading to create at least one of
a traffic report for said bicycle,
a parking report for said bicycle, and
an accident report for said bicycle.

15. The system of claim 14, wherein said access point includes said second processor.

16. The system of claim 14, wherein at least one of said processor, said second processor and said access point includes at least one instance of at least one of a finite state machine and of a computer configured to accessibly couple to a computer readable memory including a program system configured to instruct said computer.

17. The system of claim 16, further comprising said computer readable memory configured for accessible coupling to said computer.

18. The system of claim 16, wherein said program system includes at least one of the program steps of
managing said power for said radar and said radio;
receiving said radar reading from said radar;
generating said message based upon said radar reading;
using said radio to send said message;
receiving said timing synchronization message to synchronize said global clock estimate;
maintaining said global clock estimate with said local clock; and
responding to said message based upon said radar reading to create at least one of
a traffic report for said bicycle,
a parking report for said bicycle, and
an accident report for said bicycle.

19. The system of claim 13, further comprising
a sensor network, comprising
said sensor module; and
said access point communicatively coupled to said sensor module via a wireless physical transport to receive said message based upon said radar reading of said bicycle and to send said timing synchronization message.

20. The system of claim 19, wherein said sensor network further comprises
a second processor configured to respond to said message based upon said radar reading to create at least one of
a traffic report for said bicycle,
a parking report for said bicycle, and
an accident report for said bicycle.

* * * * *